May 14, 1963 T. A. GRAHAM ETAL 3,089,212
PIPE CLAMP
Filed April 16, 1959 4 Sheets-Sheet 1

INVENTORS,
THOMAS A. GRAHAM,
TELFORD L. SMITH,
JAMES C. MORRISS, JR.

BY
ATTORNEY

May 14, 1963 T. A. GRAHAM ETAL 3,089,212
PIPE CLAMP
Filed April 16, 1959 4 Sheets-Sheet 2
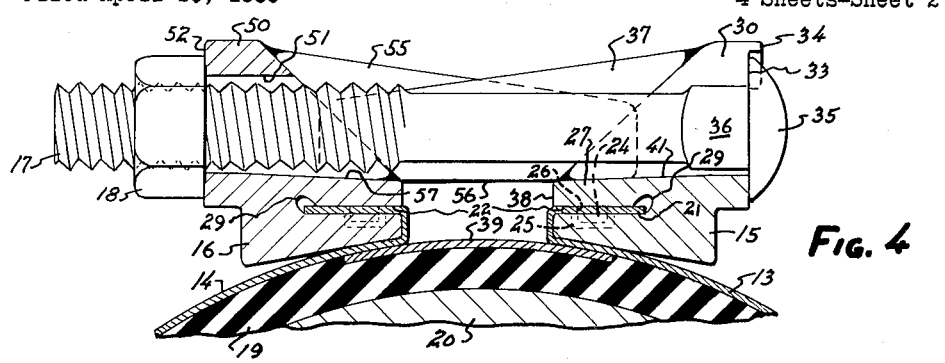
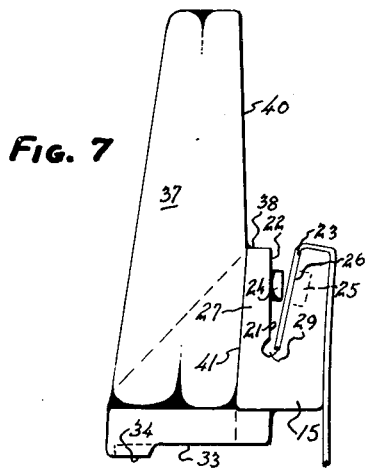
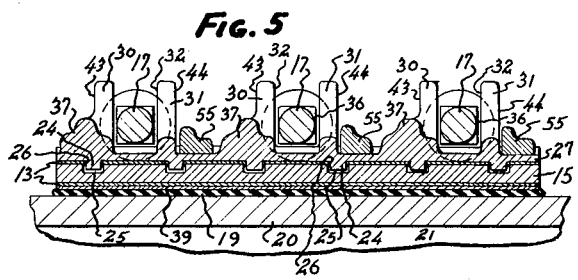
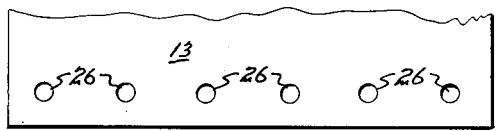
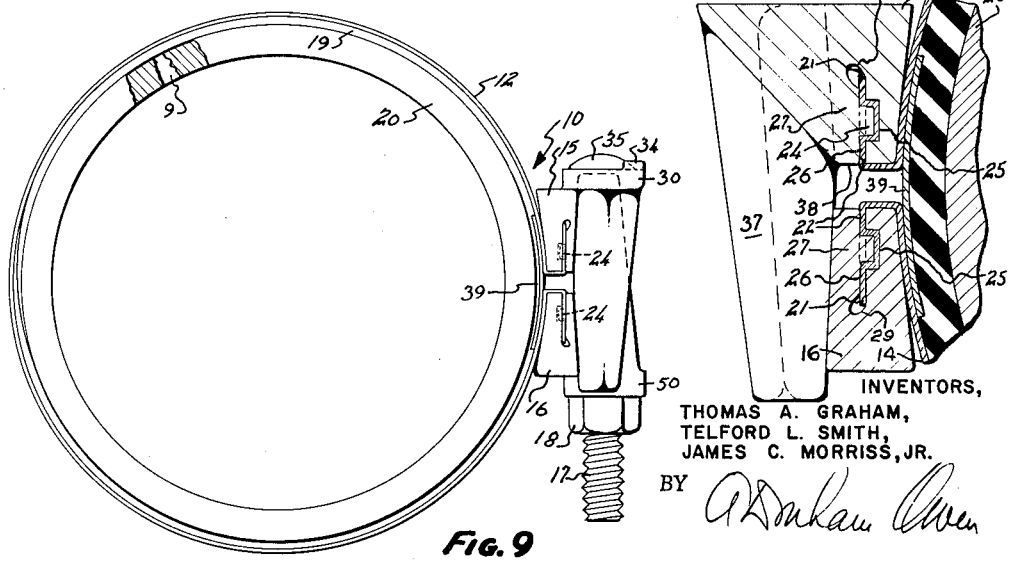
INVENTORS,
THOMAS A. GRAHAM,
TELFORD L. SMITH,
JAMES C. MORRISS, JR.
BY
ATTORNEY May 14, 1963 T. A. GRAHAM ETAL 3,089,212
PIPE CLAMP
Filed April 16, 1959 4 Sheets-Sheet 3
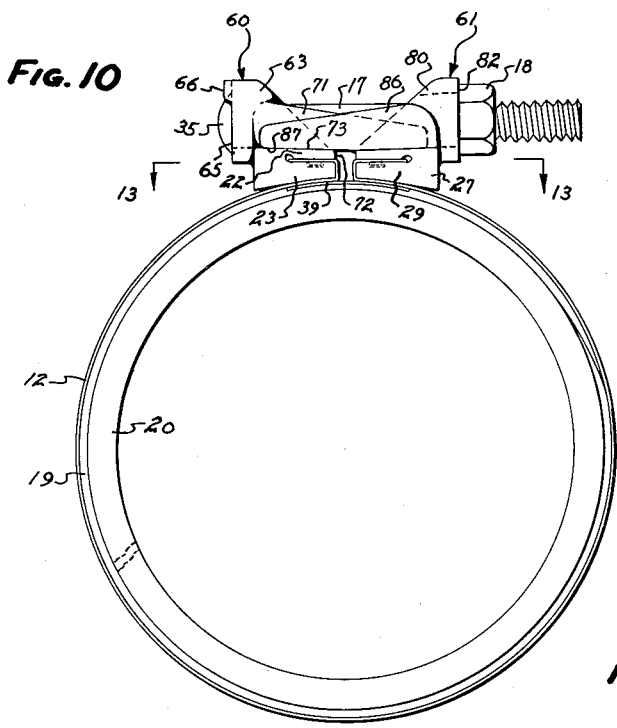
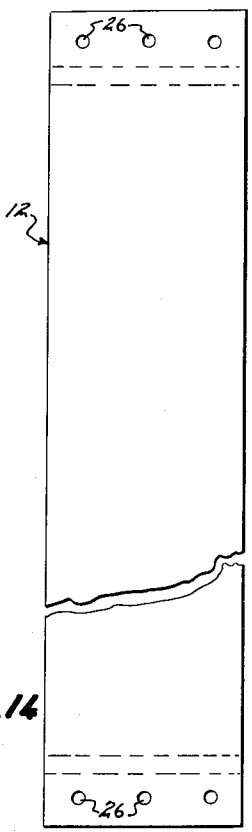
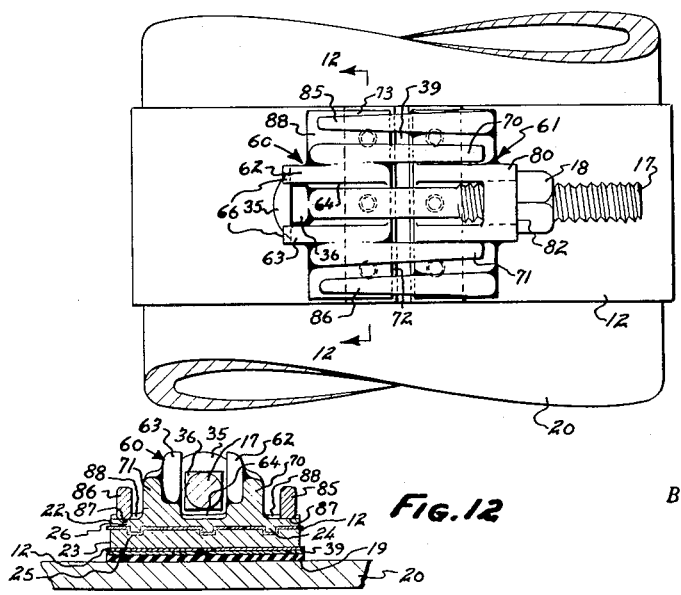
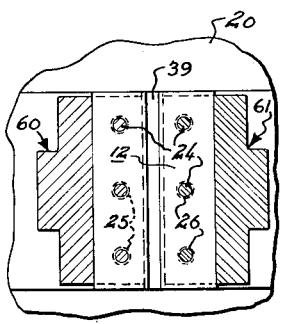
INVENTORS,
THOMAS A. GRAHAM,
TELFORD L. SMITH,
JAMES C. MORRISS, JR.
BY
ATTORNEY May 14, 1963 T. A. GRAHAM ETAL 3,089,212
PIPE CLAMP Filed April 16, 1959 4 Sheets-Sheet 4

INVENTORS,
THOMAS A. GRAHAM,
TELFORD L. SMITH,
JAMES C. MORRISS, JR.
BY
ATTORNEY ns patent office
3,089,212
Patented May 14, 1963

3,089,212
PIPE CLAMP
Thomas A. Graham, San Carlos, Telford L. Smith, Los Altos, and James C. Morriss, Jr., Belmont, Calif., assignors to Smith-Blair, Inc., San Francisco, Calif., a corporation of California
Filed Apr. 16, 1959, Ser. No. 806,869
9 Claims. (Cl. 24—279)

This invention relates to an improved pipe clamp of the type in which rigid lugs are used to secure together the ends of a malleable band that goes around the pipe. More particularly, the invention relates to the structure of mating lugs for such a pipe clamp.

Clamps with a metal band passing around and tightened by lugs have provided a maximum of encirclement of a pipe and a minimum of gouging action or concentrated pressure under the lugs. However, with these advantages, such clamps have had the disadvantage that the metal band has exerted opposite pulling action from underneath the lugs and on the facing sides of the lugs, and thereby has exerted a relative tilting action on each lug, and this has been transferred to the bolt, thereby creating a bending moment or stress. It has been a problem to keep the bolts aligned in the lugs during installation, and it has also been a problem to keep the bolts from bending when the nuts are tightened on them. During the tightening action, the considerable bending moment applied in most clamps has tended to bend the bolts to the point where the desired clamping force is not and cannot be realized. Also, it becomes difficult to take the nuts off to get the clamp apart, should that be necessary.

The present invention solves these problems by making a novel opposed lug structure with ductile metal, band end interlocking jaws and wherein tilting of the lugs and consequent bending of the bolt or bolts is prevented during tightening by providing each malleable lug with one or more pressure exerting members which slide over specially shaped surfaces on the other malleable lug. Also, wherein the usual tilting force which contsantly increases in a direction normal to the axis of the tightening bolts and particularly on the facing jaw sides of the malleable lugs is utilized to exert desirable increasing bending and closing pressure on opposite outer faces of said initially open jaw sides to positively interlock said jaws with associated band ends.

Another problem with clamps employing malleable bands has been how to secure the ends of the bands tightly to the lugs. The present invention solves this problem by a novel locking structure wherein malleable jaws of each lug are closed on the band, one jaw having locking projections and the other jaw having recesses. This not only assures against slippage of the band but also guarantees that the clamp will not fall apart in the course of placing it around a pipe while making a repair.

Our new clamp also has the advantage of being rapidly assembled on the pipe and of requiring a minimum amount of clearance around the pipe when installing it.

This combination of results is very important and has been achieved by a novel structure of the article, as will now be set forth in the specification. Other objects and advantages of the invention will also appear from the following description.

An important feature of our discovery, by which we achieve the foregoing advantages, is in providing a pair of lugs having integral guide fingers in the same general plane as the bolt or bolts which draw the lugs together. We have discovered that this arrangement gives a better result. The operating principle differs from prior-art clamps with lugs having guide fingers disposed in a plane outside the plane of the tightening bolt and remote from the side of the lugs to which the clamping band is secured. For one thing, the tendency of the tightening bolt or bolts to become bent as it or they are tightened is far greater in the latter construction than in the improved device described in this patent. By applying the tightening pressure by a bolt or bolts acting in substantially the same plane that the guide fingers lie in, any tendency for the pull of the band to twist or bend the bolt or bolts is minimized. We attribute this to a new functioning or effect of the fingers in this new arrangement. They seem to slide more easily on the sloping face of the mating lug and to act in the combination as if the bolts had a cross-section increased by the cross-section of the fingers, plus advantages attributable to the location of sloping mating sliding faces lying close to the plane of the bolts between the edge of the bolts and the side of the lugs to which the clamping band is secured.

One way of distinguishing our invention over the prior art is the fact that in our clamp the fingers are in a plane generally coincident with a plane along the inner edge of the tightening bolt or bolts.

In the drawings:

FIG. 4 is an enlarged fragmentary view in end elevation and in section taken along the line 4—4 in FIG. 2 and showing the clamp before it is fully tightened.

FIG. 5 is a view in section taken along the line 5—5 in FIG. 2.

FIG. 6 is a view in section taken along the line 6—6 in FIG. 2, but enlarged to the scale of FIG. 4 and with the clamp tightened.

FIG. 7 is a view in end elevation of one of the ductile metal lugs showing it with an end of the malleable clamping band inserted between the normally open jaws on the lug prior to any initial bending thereof and final closing of these jaws to interlocking engagement with the inserted band end.

FIG. 8 is a fragmentary plan view of a portion of the end of a malleable band having locking perforations.

FIG. 9 is a view like FIG. 1 of a clamp requiring only one pair of lugs because the malleable clamping band is in one piece and substantially encircles the pipe.

FIG. 10 is a view in end elevation of a modified form of clamp also embodying the invention and shown installed on the pipe.

FIG. 11 is a top plan view of the device in FIG. 10, with the ends of the pipe broken off.

FIG. 12 is a view in section taken along the line 12—12 in FIG. 11.

FIG. 13 is a view in section taken along the line 13—13 in FIG. 10.

FIG. 14 is a top plan view of a malleable metal band straightened out and broken in the middle in order to conserve space, and showing perforated ends.

Figure 1:
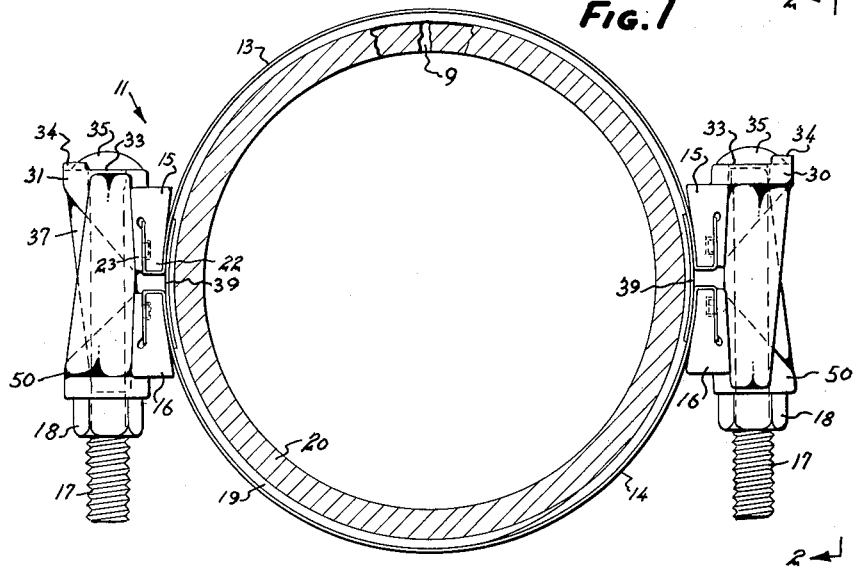
FIG. 1 is a view in end elevation of a clamp embodying the principles of the present invention installed on a pipe, the pipe being shown in section.
Figure 2:
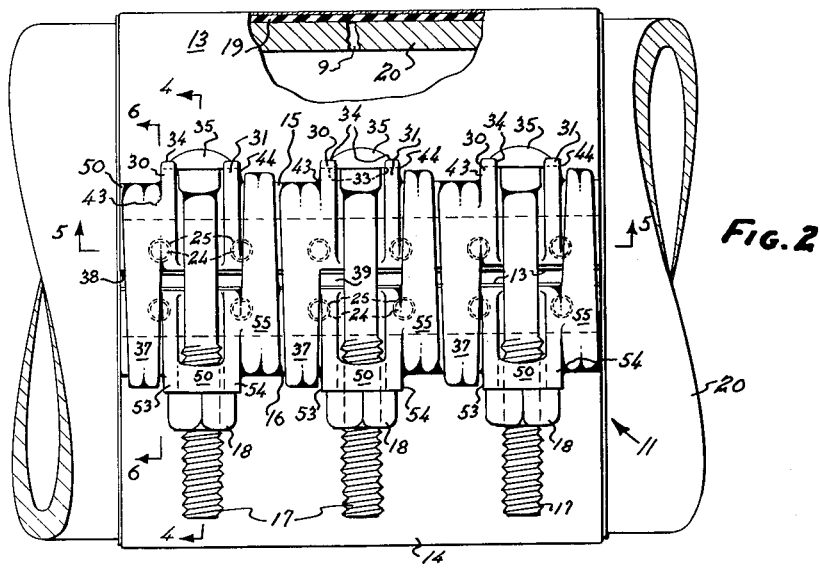
FIG. 2 is a view in side elevation of the clamp and pipe of FIG. 1, looking along the line 2—2 in FIG. 1, with the pipe ends broken off and a portion of the pipe and clamp broken away and shown in section.
Figure 3:
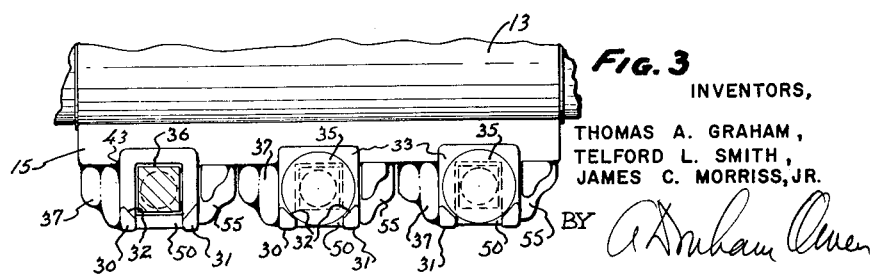
FIG. 3 is a fragmentary top plan view of one side of the same clamp.

In the present invention the clamps indicated generally by the numerals 10 (FIG. 9) and 11 (FIG. 1) embody a one-piece malleable band 12 (FIGS. 9 to 14) or a pair of semi-circular malleable bands 13 and 14 (FIG. 1) that encircled the pipe. In the form of the invention shown in FIGS. 1–9, each band 12, 13, 14 is attached at its ends to a lug 15 or 16 embodying the present invention. The lugs 15 and 16 are arranged in matching pairs and are tightened together bolts 17 and nuts 18. These pull the one-piece band 12 or the two-piece bands 13 and 14 tight around a gasket 19 or directly around the pipe 20, if and when that is desired. Preferably, a gasket 19 is used, and preferably it is provided with an armoring strip 39 adjacent the bite of the lugs 15 and 16. The numeral 9 in FIGS. 1, 2, and 9 indicates a hole or crack in the pipe 20 which the gasket 19 will seal. The higher the pressure of the fluid or gaseous medium in the pipe, the more difficult it becomes to effect a leak-proof repair.

Each mating lug 15, 16 is provided with laterally spaced apart malleable opposed side portions 21 (see FIG. 7) forming jaws 22 and 23 between which the end of the malleable clamping band 12, 13, or 14 is secured. One jaw 22 is provided with projections or studs 24 that lie opposite mating holes, recesses, or depressions 25 in the other jaw 23. In the present instance, the projections 24 extend outwardly from the radially outer jaw 22 and the holes 25 are in the radially inner jaw 23, but these elements can be reversed. The lugs 15, 16 preferably are made from ductile metal such as bronze or malleable iron. The ends of the bands 12, 13, and 14 may be punched to provide holes 26 to receive the projections 24, as shown in FIGS. 8 and 14. Preferably, however, the bands are not perforated, and the closing together of the jaws 22 and 23 under squeezing pressure exerted upon these malleable jaws normal to the axes of the tightening bolts 17, between the upwardly curving pipe surface 20 and the opposing lower surfaces of a guide finger 37 or 55 will upset and positively secure end portions of the band into the holes 26, eliminating the punching operation and giving even better holding power. Preferably, the jaws 22 and 23 are closed together in the factory so as to lock the band 12, 13, or 14 in place. This eliminates the need for other securing means to grip the band in the lugs 15, 16. To facilitate the bending action, the bottom of the slot 21 is provided with an arcuate enlargement 29. In place of separate projections 24, a single ridge may be used with a linear depression.

The lugs 15, 16 have means for holding a bolt or bolts 17 in position to accomplish a tightening of the clamp. To speed assembly of the clamp, especially when the break in the pipe is in a water-filled ditch where the workman must assemble the clamp mainly by feel, we provide in one lug member 16 a hole 51 through which clamping bolt 17 extends, and in the other lug member 15 a slot 32 into which the head of the bolt can be dropped when the unit is in place around the pipe. This means the nuts can be in place on the bolts before the clamp is placed around the pipe and all the workman has to do is to drop the bolts into the slots 32 and tighten the nuts.

Figure 16:
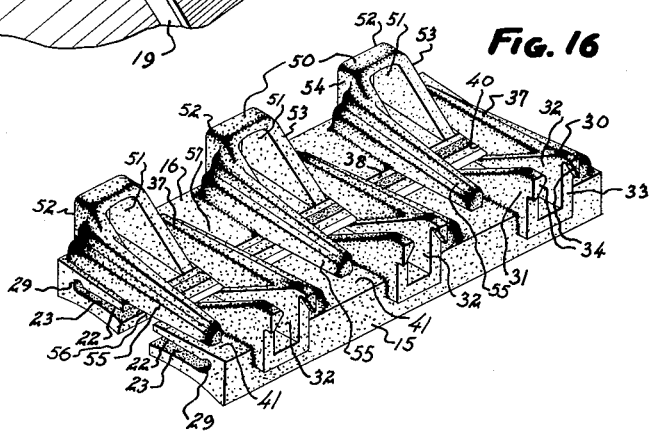
FIG. 16 is a like view of the clamp of FIGS. 1 and 2.

The slots in the lug 15 (see FIG. 16) are provided by pairs of regularly-spaced radially outwardly-extending projections 30, 31 with each pair 30, 31 defining between them a bolt-receiving channel or slot 32. The faces 33 of the channel-defining members 30 and 31 on which the head 35 of the bolt bears have ears 34 to hold the bolt in place. The bolt 17 fits with its head 35 bearing against the faces 33 and with its square shank portion 36 fitting fairly snugly in the slot 32.

The bolt-receiving slots in the mating lug 16 are provided by pairs of regularly-spaced radially outwardly-extending projections 53, 54 and these are bridged over at 50 to provide an opening 51 in which the bolt 17 is secured prior to assembly on the pipe. The end of this slotted opening 51 has a flat face 52 against which the nut 18 or a washer will bear when the nut is screwed down to tighten the clamp. Secured to each of the lugs 15 and 16 are one or more guide fingers 37 and 55 respectively, which project in the same general plane as the bolts 17 and have surfaces 40 and 56 respectively, adapted to engage smooth planar surfaces 41 and 57 respectively, on the mating lugs. The latter surfaces lie between the edge of the bolt 17 and the band-securing slot 22 (see FIG. 4). We prefer to have the bottom surfaces 40, 56 of the arms or fingers 37, 55 extend beyond the edge 38 of the jaws 22, 23 of the lugs at an angle inclined upwardly at about 3°. The surface 41 of the lug 15 is also upwardly inclined at about 3° but in the opposite direction to receive the finger 55 of the lug 16.

Figure 15:
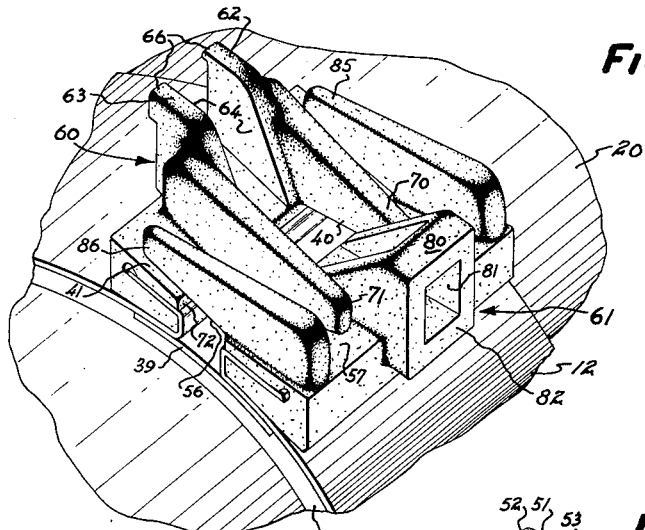
FIG. 15 is an isometric view of the clamp of FIGS. 10 and 11, with the bolt removed.

The number of fingers 37, 55 which are provided and their location in relation to the bolt-receiving slots can be varied. Compare FIGS. 15 and 16, which show typical arrangements. The principle remains the same in any case. We have found a 3° angle for the surfaces 40, 41, 56, 57 to be preferred, but this may be varied from 0° to more than 3° and still retain many of the advantages of our invention.

To install a clamp in which the clamping band has been secured as noted above, the lug 16 is aligned with the lug 15 so the fingers 37 lie along the sides and carriage bolts 17 have been placed in the holes 51 in the lug 15 with the heads 35 on the end opposite to the outer surface 52, 53 and the fingers 55 lie along the sides 54. This brings the guiding members 37 and 55 into position so their respective surfaces 40, 56 slide on and engage the surfaces 41 and 57. The lugs are moved as close together as hand pressure will effect and then the bolts 17 are dropped into the slots 32 so their heads 35 can be held on the face 33 by the ears 34. With one hand holding the heads 35 in the slots, the other hand can tighten the nuts 18 to the point where a wrench is needed for further tightening. It is where substantial clamping force is applied by screwing the nuts 18 on the bolts 17 that the benefits of our invention are realized. As each increment of increased force is applied by the bolts to the clamping lugs 15, 16 and a corresponding force is exerted on the ends 13, 14 of the clamping band, the tendency of the lugs to rotate about the latter is overcome by the guide fingers 37, 55 through their mating surfaces 40, 56 and 41, 57. The latter are so positioned as to counterbalance the forces that would cause the lugs to rotate about the ends of the clamping band, with the result that the lugs maintain substantial alignment in all directions as they are drawn together. The effect this has on the clamping action as a whole is to give a tighter hold on the pipe and to seal higher pressures. We have found that a clamp with the lugs made as described herein will seal at far higher pressures than any band-type clamp known before. This apparently is because the fingers keep the lugs from tilting about the clamped ends of the bands, so there is a straight pull by the bolts on the lugs. This same feature also holds the lugs so the bolts do not bend. Tests made so far would indicate that this is because each finger is located to engage and slide on the opposite lug in a plane lying between the inner edge of the bolts and the slot 22 in which the clamping band is secured.

FIGS. 10 through 14 show an embodiment of our invention where only one bolt 17 is to be used to tighten the pair of lugs 60 and 61.

The malleable band 12 that encircles the pipe 20 is attached at one end to the lug 60 and at the other end to lug 61. A gasket 19 lies between the pipe 20 and the band 12.

As in the prior example, each lug 60, 61 is provided with jaws 22 and 23, between which the malleable band 12 is fastened.

The lug 60 is provided with a pair of radially outwardly extending projections 62, 63 forming a channel 64 between. The end face 65 of the channel is flat and has ears 66 to retain the bolt head on the face 65 during use. The square shank portion 36 of the bolt 17 fits in the channel 64. The lug 60 has fingers 70, 71 which extend beyond the edge 72 of the lug 60. These fingers have a bottom surface 74 each of which is upwardly cammed or inclined at about 3°. The upper surface 73 of the lug 60 is also upwardly inclined at about 3° in the opposite direction to the surfaces 74.

The mating lug 61 has radially outward projecting flanges which are bridged at 80 to define an opening 81 through which the bolt projects. Its nut 18 bears against the flat rear face 82.

The lug 61 also has a pair of fingers 85, 86 extending out from it with lower surfaces 87 tilted upwardly at about 3°, and has the upper surfaces 88 which are tilted upwardly in the opposite direction at about 3°. These fingers 85, 86 are spaced to lie axially beyond and one on each side of the fingers 70, 71. Their spacing is not critical. They can lie next to them or they can be spaced apart.

With this single bolt clamp, the installer, before placing the clamp around the pipe, will place the bolt 17 in the hole 81 with the head of the bolt against the face 82. He will then place the clamp around the pipe, drop the bolt into the slot 64, and tighten the nut 18 by hand to bring the clamp into position. Thereafter, he will use a wrench to tighten the nut 18 and this will cause the lugs 60 and 61 to move toward each other. The fingers 70, 71 will slide on the surface 88 on lug 61 and the fingers 85, 86 will slide on the surface 73 on the lug 60. This assures that the lugs will not twist or rotate about the ends of the band 12, nor will the bolt 17 bend.

Tests have shown that by the use of lugs made as described herein, greater clamping pressures can be obtained than by earlier forms of lugs. Also, that this new arrangement of the parts gives a new and better result.

What we claim as our invention is:

1. In a pipe clamp of the type having a malleable band with end portions secured in lugs, with the lugs in pairs and tightened together by bolts, the combination wherein each lug has a pair of malleable jaws between which said end portions fit, one jaw having projections, the other jaw having recesses opposite said projections, said jaws being initially cast in an open, spread-apart position and then closed with said projections fitting into said recesses and thereby holding said end portions, each said lug having a radially outer sloping planar surface with radial projections defining bolt-receiving means and generally tangentially projecting fingers with a radially inner sloping planar surface engaging the radially outer sloping planar surface of a mating lug along a point radially inside said bolt-receiving means.

2. The combination of claim 1 wherein said fingers are arranged with the bolt-receiving means of one lug lying between two of the fingers of its own lug that engage outer surfaces of the bolt-receiving means of the other lug and the fingers of the other lug are spaced apart axially to engage said one lug at a spaced distance from said one lug's fingers.

3. In a pipe clamp of the type having a malleable band with ends secured in rigid lugs, with the lugs in pairs and tightened together by bolts, the combination of end portions of said band having a series of perforations therethrough and pairs of lugs, each lug having a pair of malleable jaws between which said end portions fit, one jaw having projections, the other jaw having recesses opposite said projections, said jaws being closed with said projections extending through said perforations and fitting into said recesses, each said lug having a body with a radially outer surface from which extend out radial projections defining bolt-receiving means between them, some of said projections having along at least one outer face a generally tangentially projecting arm extending beyond the body of said lug, the radially inner surfaces of the projecting portions of said arms being inclined and said radially outer surfaces of said lug bodies also being inclined but in an opposite direction to that of the arms which project from them.

4. In a pipe clamp of the type having a malleable band with ends secured in lugs with the lugs in pairs and tightened together by bolts, the combination wherein each lug has a pair of jaws of malleable cast metal material between which a said end fits, one jaw having projections, the other jaw having recesses opposite said projections, said jaws being closed on a said band end with said projections fitting into said recesses so that said jaws hold said ends tightly, one said lug having pairs of parallel, radial projections defining between them a series of bolt-receiving slots, one of each pair of projections having along one of its outer faces a projecting arm extending beyond the body of said lug, the other said lug having a series of radial projections in pairs, each pair providing a through bolt opening, and with side surfaces aligned with the outer faces of said parallel projections, one side surface of each being engageable with a said arm, the other side surface having a second projecting arm extending beyond the body of that lug into engagement with the outer face of the other said projection of the said one lug.

5. In a pipe clamp of the type having a malleable band with ends secured in lugs, with the lugs in pairs and tightened together by a bolt, the combination wherein each lug has a pair of malleable jaws between which a said end fits, said jaws being bendable from a normally spread apart position with one jaw having projections, the other jaw having recesses opposite said projections, said jaws being closed with said end held by said projections fitting into said recesses, each said lug having a radially outer surface with radial projections extending out therefrom and defining bolt receiving means, one said lug having fingers alongside each outer axial side of said bolt-receiving means generally transverse the axis of the pipe and projecting generally tangentially toward and into securing engagement with one malleable jaw of the other said lug, with side surfaces closely adjacent the sides of said bolt-receiving means of said other lug and with radially inner surfaces engaging said radially outer surface of said other lug and preventing bending of said bolt.

6. The combination of claim 5 wherein said other lug has a pair of fingers, one axially outside the fingers of said one lug and projecting generally tangentially with its radially inner surface engaging and securing the radially outer malleable jaw surface of said one lug.

7. The combination of claim 5 wherein said radially inner surfaces of said fingers are inclined out at about 3° to the tangential line and said radially outer surfaces of said lugs are inclined out at about 3° to the tangential line, the fingers and outer surfaces of the same lug being oppositely inclined.

8. In a pipe clamp of the type having a malleable band with ends secured between jaw portions of lugs, with the lugs in pairs and tightened together by bolts to secure said jaw portions in closed positions on said band ends, the combination of end portions of said band having a series of perforations therethrough and pairs of lugs, each lug having a pair of malleable jaws between which said perforated end portions fit, one jaw having projections extending through said perforations, the other jaw having recesses opposite said projections, said jaws being secured in closed position on said band ends on tightening of said bolts on said lugs with said projections fitting into said recesses.

9. In a pair of rigid lugs for a pipe clamp of the malleable-band type, each lug having a bendable pair of malleable jaws between which an end of said band fits, one jaw having projections, the other jaw having recesses opposite said projections, said jaws being originally cast in the open position and then closed after the insertion therein of the end of said band with said projections fitting into said recesses to hold said band in place, and bolt means for securing said jaws of said lugs on said band ends about a pipe.

References Cited in the file of this patent

UNITED STATES PATENTS 50,688    Cogan _____ Oct. 31, 1865

(Other references on following page)

UNITED STATES PATENTS

| | | |
|---|---|---|
| 1,788,505 | Beard | Jan. 13, 1931 |
| 2,359,418 | Hartman | Oct. 3, 1944 |
| 2,690,193 | Smith | Sept. 28, 1954 |
| 2,713,352 | Schustack | July 19, 1955 |
| 2,826,799 | Schustack | Mar. 18, 1958 |
| 2,853,762 | Smith | Sept. 30, 1958 |
| 2,897,568 | Hoke | Aug. 4, 1959 |
| 2,936,186 | Dunmire | May 10, 1960 |
| 2,998,629 | Smith | Sept. 5, 1961 |